(12) United States Patent
Norrman et al.

(10) Patent No.: US 8,788,705 B2
(45) Date of Patent: Jul. 22, 2014

(54) METHODS AND APPARATUS FOR SECURE ROUTING OF DATA PACKETS

(75) Inventors: Karl Norrman, Stockholm (SE); Jukka Ylitalo, Espoo (FI); Mats Näslund, Bromma (SE); Pekka Nikander, Jorvas (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 117 days.

(21) Appl. No.: 13/520,301

(22) PCT Filed: Jan. 4, 2010

(86) PCT No.: PCT/SE2010/050001
§ 371 (c)(1),
(2), (4) Date: Jul. 2, 2012

(87) PCT Pub. No.: WO2011/081588
PCT Pub. Date: Jul. 7, 2011

(65) Prior Publication Data
US 2013/0124757 A1    May 16, 2013

(51) Int. Cl.
*G06F 15/173* (2006.01)

(52) U.S. Cl.
USPC .......................................................... 709/242

(58) Field of Classification Search
USPC .................................................... 709/242
See application file for complete search history.

(56) References Cited

U.S. PATENT DOCUMENTS

2006/0114916 A1 * 6/2006 Vasseur et al. ................ 370/397
2007/0058568 A1 * 3/2007 Previdi et al. ................. 370/254

FOREIGN PATENT DOCUMENTS

WO    WO 2006/070172 A1    7/2006

OTHER PUBLICATIONS

International Search Report, PCT/SE2010/050001, Sep. 23, 2010.
Dong et al, "ARMR: Anonymous routing protocol with multiple routes for communications in mobile ad hoc networks," Ad Hoc Networks 7 (2009), pp. 1536-1550.
Han et al., "Mutual Anonmity for Mobile P2P Systems," IEEE Transactions on Parallel and Distributed Systems, vol. 19, No. 8, Aug. 2008, pp. 1009-1019.
Written Opinion of the International Searching Authority, PCT/SE2010/050001, Sep. 23, 2010.

* cited by examiner

*Primary Examiner* — Tu Nguyen
(74) *Attorney, Agent, or Firm* — Myers Bigel Sibley & Sajovec (57) ABSTRACT

Methods and arrangements for supporting a forwarding process in routers when routing data packets through a packet-switched network, by employing hierarchical parameters in which the hops of a predetermined transmission path between a sender and a receiver are encoded. A name server generates and distributes router-associated keys to routers in the network which keys are used for computing the hierarchical parameters.

32 Claims, 5 Drawing Sheets

METHODS AND APPARATUS FOR SECURE ROUTING OF DATA PACKETS

CROSS-REFERENCE TO RELATED APPLICATION

This application is a 35 U.S.C. §371 national stage application of PCT International Application No. PCT/SE2010/050001, filed on Jan. 4, 2010, the contents of which are incorporated by reference herein as if set forth in their entirety. The above-referenced PCT International Application was published in the English language as International Publication No. WO 2011/081588 on Jul. 7, 2011.

TECHNICAL FIELD

The invention relates generally to methods and arrangements for supporting a forwarding process in routers when routing data packets through a packet-switched network such as the Internet.

BACKGROUND

In many communication services of today, data packets are conveyed between different communicating parties over public packet-switched IP (Internet Protocol) networks. In this process, data packets from a sending party are transmitted through multiple interconnected routers in a transmission path to a targeted receiving party. When receiving an incoming data packet, each router performs a forwarding operation to determine the "next hop" for the packet, i.e. the next router in the transmission path, and move the packet towards its destination. It is well-known in the art that different packets of a session may take different routes between two communicating parties, e.g. depending on the network load and other factors influencing forwarding decisions made in the routers.

The communication parties discussed in this description may involve any equipment capable of packet-based communication, such as fixed and mobile telephones, computers, servers, game stations, etc. Here, the terms "sender" and "receiver" will often be used for short to represent any packet sending equipment and packet receiving equipment, respectively, being end points in a session of transferring data packets from the sender to the receiver over a network with routers or equivalent nodes.

Figure 1:
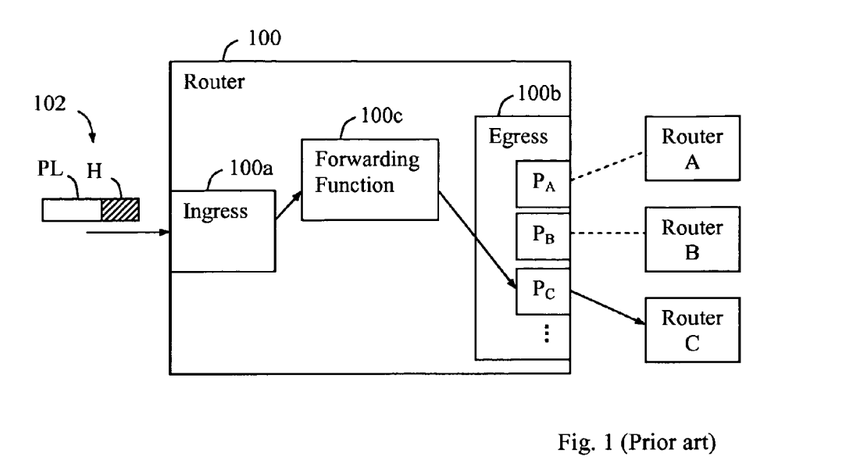
FIG. 1 is a schematic block diagram illustrating a conventional router in a packet-switched network, according to the prior art.

In FIG. 1, the basic structure of a conventional router 100 is shown, when operating in a packet-switched network. The router 100 comprises an ingress part 100a, an egress part 100b and a forwarding function 100c, the latter being used for determining the next hop for an incoming data packet. The egress part 100b comprises a plurality of outgoing ports $P_A$, $P_B$, $P_C$, . . . for links to different neighbouring routers A, B, C, . . . , respectively. Once a next hop to router C is determined in the forwarding function 100c, the packet can be sent out on the outgoing port $P_C$ associated to that router.

When an incoming data packet 102 basically having a payload field PL and a header H, is received at the ingress unit 100a, the forwarding function 100c determines which next router the packet should be sent to, typically based on destination information in the header H. In this example, the header information in the packet allows for router C as the next suitable hop, and the packet 102 is therefore sent out on the corresponding port $P_C$ which is connected to router C.

Each communication party has typically been assigned an IP address which is included in the packet header information and may be used in the forwarding operation above for routing any data packets directed towards that communication party. The communication party may also have been assigned a host name, such as user@operator.com, which is associated with an IP address in a DNS (Domain Name Server) system. Thus, when queried by a sender with a host name of a targeted receiver, the DNS will provide the current IP address of the receiver which the sender can include as destination address in any data packets directed to that receiver. Forwarding decisions can then be made in the routers based on the destination address in the packets.

However, packet-switched networks using IP (Internet Protocol) addressing such as the Internet have generally unsatisfactory support for security. Thus, it has been found necessary or desirable to protect the packets from being intercepted or "eavesdropped" by unauthorised parties, and also to avoid traffic of unwanted data packets through the networks, e.g. by encryption and authorisation of the data packets. While protection against unwanted traffic is often employed at the receiver, e.g. spam filtering for e-mails or the like, basic protection against unwanted traffic of data is often lacking within the packet-switched networks.

Since IP addresses are publicly distributed by DNS systems or similar as described above, any communication party is basically able to send messages and data packets to any other communication party over the Internet, resulting in the well-known problems of flooding, spamming, virus and fraud. Hence, it has generally become a problem that any communication party can get across data packets totally out of control of the receiving communication party. Also, the transport of unwanted data packets can still consume network resources along the entire sender-receiver path, even though the packets may be discarded at the receiver anyway.

Another approach has therefore been devised to support the forwarding operation in the routers. Instead of providing the IP address of a target receiver, the DNS, or more generally a "name server", pre-determines a distinct transmission path between a sender and a receiver and encodes all hops, i.e. the intermediate routers and/or links along the path, into a so-called "Bloom filter", sometimes also referred to as a "zFilter". In this process, it is assumed that the name server has sufficient knowledge of the network topology to determine the transmission path.

Briefly described, a Bloom filter is a bit-vector of some predetermined length, m, together with a set of k hash functions h1, h2, . . . hk, mapping into the set $\{1, 2, \ldots, m\}$. To insert some data item, x, into the Bloom filter, bit-positions h1(x), h2(x), . . . hk(x) of the bit-vector are all set to "1". Conversely, in order to determine if a certain candidate data item, y, is a member of a data set being encoded by the Bloom filter, bit-positions h1(y), h2(y), . . . hk(y) are checked, and if all these bit-positions are "1", it can be assumed that y is actually a member of the data set. As a result, it may happen that Bloom filters have so-called "false positives" since the bit positions could have been set to "1" by some other element(s), different from y. However, the rate of false positives can be controlled by selecting appropriate values of m and k.

When queried by a sender for a receiver, the name server creates the appropriate Bloom filter defining the path with all intermediate links between sender and receiver, and provides it to the sender to be included in each data packet sent out towards the receiver.

Using this approach, routers will analyse the Bloom filter attached to each received data packet in order to detect if any candidate next hop link from the current router, has been encoded into the Bloom filter. When finding a match with a next hop link in this matching operation, the packet is transmitted on that link to the next router where the forwarding operation is repeated. Effectively, the Bloom filter authorises the data packet to be transmitted to the receiver. If none of the router's candidate links is found in the Bloom filter, i.e. no match, the packet is discarded for being non-authorised.

Figure 2:
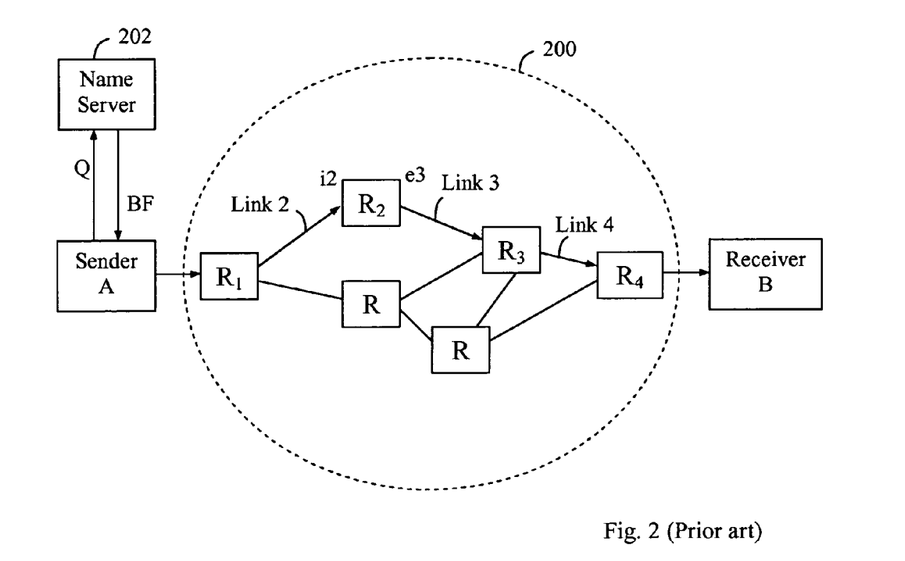
FIG. 2 illustrates a typical transmission path scenario for routing data packets from a sender A to a receiver B, where the present invention can be utilised.

An exemplary scenario for transmitting data packets through a network with routers R using the above Bloom filter approach, is schematically illustrated in FIG. 2, involving a sender A, a receiver B, a public packet-switched network 200 with a plurality of routers R, and a name server 202. When the sender A basically makes a query Q in the name server 202 for sending data packets to the receiver B, server 202 predetermines a transmission path over four intermediate routers R1-R4 between sender A and receiver B, based on the known network topology. The transmission path includes links 1-3 connecting the neighbouring routers R1-R4 as shown in the figure. The query Q can also be seen as a request for a Bloom filter "BF" leading to receiver B.

After applying some suitable security control for determining if the sender is allowed to get across data packets to the receiver, the name server 202 then defines a BF in which at least the different links 2-4 between routers R1-R4 are encoded, and the BF is provided to sender A in response to the query Q. The sender A is then able to get across data packets to receiver B by including the BF in transmitted packets, while each router R1-R4 determines the next hop for each received packet based on the BF therein, as described above. The name server 202 can also apply various admission control functions before providing the BF to the sender to enable A to get across data packets to B.

The links in the transmission path may be defined by individual explicit link identities. Alternatively, the hops over different links may be defined by fitting ingress and egress identities in each router, e.g. port numbers. For example, a hop over link 3 between R2 and R3 can be defined by an ingress identity i2 in R2 and an egress identity e3 in R2 leading to R3, i.e. as a routing parameter or hop identity (i2,e3). In this description, the term "next hop parameter" represents any suitable information in a BF that determines the next hop in the predetermined transmission path, indicated either as a link, a next router or the above ingress/egress combination.

When receiving the packet, router R2 will match a number of candidate links or hops, one by one, with the BF in the packet. When finding a matching routing parameter (i2,e3) for link 3 that has been encoded into the BF, router R2 sends out the packet on link 3 according to egress identity e3, and so forth. If no candidate link or hop is found in the BF, the packet is simply discarded. In this way, security can be implemented in the name server for submitting a BF to the requesting sender. It should be noted that several candidate hops at the router R2 may be found to match the BF such that the packet will be sent out on all the matching links. Hence, Bloom filter based routing may also be used to implement multi-cast is a convenient way.

Nevertheless, it may be too easy for advanced hackers to derive a BF from an intercepted packet for getting across potentially unwanted data packets to the same destination. Furthermore, the forwarding operation and packet transmission is delayed since, when using BF routing schemes known in the art, each router must read and process the entire packet header before the information encoded therein can be detected and the forwarding decision can be made.

SUMMARY

It is an object of the invention to address at least some of the problems outlined above. It is also an object to obtain a mechanism for avoiding transmission of unwanted data packets in a public packet-switched network, at the same time avoiding undue processing delays and load in the routers. These objects and others can be achieved by providing methods and apparatuses as defined in the attached independent claims. In the following description, the term "name server" will be used to represent any node or functional entity that is capable of providing routing information to querying senders. Another useful name could be "Routing Information Server".

According to one aspect, a method is provided in a name server for supporting a forwarding operation in routers of a packet-switched network. In this method, when a request is received from a sending end-node related to getting data packets across to a receiving end-node in a communication session, a transmission path is determined with a series of hops from the sending end-node to the receiving end-node. Then, a semi-dynamic parameter is computed for each hop in the path based on a predefined router-associated key, and at least the computed semi-dynamic parameters are provided to the sending end-node in response to the request. Thereby, the sending end-node is able to compute a dynamic parameter for each hop in the path based on the semi-dynamic parameters and some packet-specific information related to a data packet, and to send the data packet with the computed dynamic parameters and the packet-specific information over the packet-switched network through the transmission path.

According to another aspect, an arrangement is provided in a name server configured to support the forwarding of data packets in routers of a packet-switched network. The name server comprises a receiving unit adapted to receive a request from a sending end-node related to getting data packets across to a receiving end-node in a communication session, and a determining unit adapted to determine a transmission path with a series of hops from the sending end-node to the receiving end-node. The name server further comprises a computing unit adapted to compute a semi-dynamic parameter for each hop in the path based on a predefined router-associated key, and a providing unit adapted to provide at least the computed semi-dynamic parameters to the sending end-node in response to the request.

According to another aspect, a method is provided in a sending end-node for supporting a forwarding operation in routers of a packet-switched network when sending data packets. In this method, a request is first sent to a name server related to getting data packets across to a receiving end-node in a communication session. Then, semi-dynamic parameters are received from the name server in response to the request, each semi-dynamic parameter being associated with a hop in a transmission path from the sending end-node to the receiving end-node. The sending end-node then generates packet-specific information related to a data packet to send, and computes a dynamic parameter for each hop in the path based on the corresponding semi-dynamic parameter and the generated packet-specific information. The sending end-node finally sends the data packet with the computed dynamic parameters and the packet-specific information over the packet-switched network through the transmission path. Thereby, the routers are able to compute a dynamic parameter for each available outgoing link or candidate hop in at least one router in the transmission path based on the packet-specific information in the packet, and to match the computed dynamic parameters with the dynamic parameters in the packet.

According to another aspect, an arrangement is provided in a sending end-node configured to support a forwarding operation in routers of a packet-switched network when sending data packets. The sending end-node comprises a first sending unit adapted to send a request to a name server related to getting data packets across to a receiving end-node in a communication session, a receiving unit adapted to receive semi-dynamic parameters from the name server, each semi-dynamic parameter being associated with a hop in a transmission path from the sending end-node to the receiving end-node, and a generating unit adapted to generate packet-specific information related to a data packet to send. The sending end-node further comprises a computing unit adapted to compute a dynamic parameter for each hop in the path based on at least the corresponding semi-dynamic parameter and the generated packet-specific information, and a second sending unit adapted to send the data packet with the computed dynamic parameters and the packet-specific information over the packet-switched network through the transmission path.

According to another aspect, a method is provided in a router of a packet-switched network for performing a forwarding operation. In this method, a data packet is received, coming from a sending end-node in a communication session and comprising dynamic parameters and packet-specific information related to the data packet, each dynamic parameter being associated with a hop in a transmission path from the sending end-node to a receiving end-node. The router then computes or retrieves a semi-dynamic parameter for each available outgoing link or candidate hop in the router, the semi-dynamic parameter being computed based on a predefined router-associated key. The router also computes a dynamic parameter for each outgoing link or candidate hop in the router based on the corresponding computed semi-dynamic parameter and the packet-specific information in the received packet. The router then determines whether any of the computed dynamic parameters matches any of the dynamic parameters in the received packet, and if a match is found the packet is forwarded on an outgoing link or candidate hop corresponding to the matching computed dynamic parameter. Otherwise, the packet is discarded.

According to another aspect, an arrangement is provided in a router of a packet-switched network configured to perform a forwarding operation. The router comprises a receiving unit adapted to receive a data packet coming from a sending end-node in a communication session and comprising dynamic parameters and packet-specific information related to the data packet, each dynamic parameter being associated with a hop in a transmission path from the sending end-node to a receiving end-node. The router also comprises a computing unit adapted to compute or retrieve a semi-dynamic parameter for each available outgoing link or candidate hop in the router, each semi-dynamic parameter being computed based on a predefined router-associated key, and to compute a dynamic parameter for each available outgoing link or candidate hop in the router based on the corresponding computed semi-dynamic parameter and the packet-specific information in the received packet. The router further comprises a determining unit adapted to determine whether any of the computed dynamic parameters matches any of the dynamic parameters in the received packet, and a forwarding unit adapted to forward the packet on an outgoing link or candidate hop corresponding to a matching computed dynamic parameter, or to discard the packet if no matching computed dynamic parameter is found.

The above methods and arrangements in the name server, sending end-node and router, respectively, can be configured according to different embodiments.

In one embodiment in the name server, the semi-dynamic parameter is computed further based on a session identifier related to the communication session, and the session identifier is also provided to the sending end-node in response to the request, thereby enabling the sending end-node to include the session identifier when sending the data packet. In this way, the semi-dynamic parameter will be associated to that particular session.

In the name server, a semi-static parameter may also be computed for each hop in the path based on the predefined router-associated key, and the semi-dynamic parameter may be computed further based on the corresponding semi-static parameter.

The predefined router-associated key may further be distributed to corresponding routers in an initialisation phase and may also be changed according to a predefined updating scheme. In other possible embodiments in the name server, each router-associated key comprises a base key and a plurality of sub-keys derived from the base key using a Key Derivation Function, and the semi-static parameter is computed for each hop in the path based on a first one of the sub-keys. The semi-dynamic parameter may also be computed for each hop in the path further based on a second one of the sub-keys.

The name server may also provide a third one of the sub-keys to the sending end-node, thereby enabling the sending end-node to compute the dynamic parameter for each hop in the path further based on the third sub-key.

In a further embodiment in the sending end-node, a session identifier related to the communication session is also received from the name server, and the session identifier is included when sending the data packet.

In another possible embodiment in the sending end-node, the dynamic parameters are included in a Bloom filter added to the packet, thereby enabling the routers to match available next-hop links against the Bloom filter for making forwarding decisions. If each router-associated key comprises a base key and a sub-key derived from the base key using a Key Derivation Function, the sub-key also being received from the name server, the sending end-node may compute the dynamic parameter for each hop in the path further based on the sub-key.

In one embodiment in the router, when the received data packet also comprises a session identifier related to the communication session, the router computes the semi-dynamic parameter further based on the session identifier. In another embodiment, a semi-static parameter has also been computed for each available outgoing link or candidate hop in the router based on the predefined router-associated key, and the semi-dynamic parameter is then computed further based on the corresponding semi-static parameter.

The router may further compute the dynamic parameter by a cryptographic function which is based on a self-synchronizing stream cipher, and the computation can begin before all bits of the packet-specific information in the packet have been received. The dynamic parameter may further be computed for plural available outgoing links or candidate hops in parallel. The forwarding operation can thereby be made with a minimum of delay.

If the packet comprises a Bloom filter in which the dynamic parameters are included, the router may match available outgoing links or candidate hops against the Bloom filter for making forwarding decisions.

A method of supporting a forwarding operation in routers of a packet-switched network, can also be described as follows:
  a name server receives a request from a sending end-node related to getting data packets across to a receiving end-node in a communication session, the name server determines a transmission path with a series of hops from the sending end-node to the receiving end-node, the name server computes a semi-dynamic parameter for each hop in the path based on a predefined router-associated key, the name server provides at least the computed semi-dynamic parameters to the sending end-node in response to the request, the sending end-node generates packet-specific information related to a data packet to send, the sending end-node computes a dynamic parameter for each hop in the path based on the corresponding semi-dynamic parameter and the generated packet-specific information, the sending end-node sends the data packet with the computed dynamic parameters and the packet-specific information over the packet-switched network through the transmission path, a router in the transmission path receives the packet and computes or retrieves a semi-dynamic parameter for each available outgoing link or candidate hop in the router, each semi-dynamic parameter being computed based on at least the predefined router-associated key, the router computes a dynamic parameter for each available outgoing link or candidate hop in the router based on the corresponding computed semi-dynamic parameter and the packet-specific information in the received packet, the router determines whether any of the computed dynamic parameters matches any of the dynamic parameters in the received packet, and if a match is found, the router forwards the packet on an outgoing link or candidate hop corresponding to the matching computed dynamic parameter, otherwise the router discards the packet.

Further possible features and benefits of this solution will become apparent from the detailed description below.

BRIEF DESCRIPTION OF THE DRAWINGS

The invention will now be described in more detail by means of exemplary embodiments and with reference to the accompanying drawings, in which.

DETAILED DESCRIPTION

This solution can be used to provide a packet forwarding mechanism in routers which is effective and secure but does not cause any undue delays or excessive processing load, when routing data packets from a sender to a receiver through a packet-switched network. To achieve this, the above-described Bloom filter approach can be utilised in a novel manner as described herein. However, the invention is not limited to using a Bloom filter which will be exemplified below.

As mentioned above, the Bloom filter BF is basically used in transmitted data packets to encode the hops of a predetermined transmission path from a sender (i.e. a packet sending end-node) to a receiver (i.e. a packet receiving end-node), such that each router in the path is able to determine the correct next hop based on the BF. In this novel solution, each hop can be encoded by means of hierarchical parameters in e.g. three levels 1-3 as follows:

A semi-static parameter denoted "O1" is used in a first level, a semi-dynamic parameter denoted "O2" is used in a second level encompassing the semi-static parameter O1, and a dynamic parameter denoted "O3" is used in a third level encompassing the semi-dynamic parameter O2. Thereby, both parameters O1 and O2 are embedded in the third level dynamic parameter O3, and one O3 value per hop is included in the data packet when transmitted from the sender. The O3 values may be included in a BF added to each packet such that existing mechanisms for handling a BF can be reused by the routers, although the invention is not limited to using a BF.

Basically, the term "semi-static" implies that parameter O1 is changed at predetermined intervals. Further, the term "semi-dynamic" implies that parameter O2 is changed on a more dynamic basis typically more often than the semi-static parameter O1, and the dynamic parameter O3 is changed more often than the semi-dynamic parameter O2.

In one possible embodiment, a semi-static parameter O1 is computed for each hop and router based on a predefined "router-associated" key which is changed according to a predefined key updating scheme. The semi-dynamic parameter O2 is computed based on at least the semi-static parameter O1 and a suitable session identifier "SID" related to a particular communication session. Finally, the dynamic parameter O3 is computed for each individual data packet based on at least the semi-dynamic parameter O2 and some packet-specific information "I".

The dynamic parameter O3 thus changes for every packet, while parameters O1 and O2 may remain the same for multiple packets within a session. The parameter O1 could remain fixed even for several different sessions depending on the key updating scheme. The sender generates I, computes O3 for each hop in the path and incorporates both O3 and I in each transmitted packet. As mentioned above, O3 may be encoded in a BF included in the packet. Alternatively, the O3 values may be added "as is" to the packet, i.e. explicitly. In this solution, a router-associated key may be associated with only one router or may be shared by two or more routers.

Thereby, each router can basically compute O1 in advance for each possible outgoing link, or "candidate hop", i.e. before any packet is received. Further, each router needs to compute O2 of a session just once for each possible outgoing link or candidate hop, after receiving the first packet of that session. In each subsequent packet of the same session, only the O3 values will change, unless the router-associated key is changed according to the predefined updating scheme.

In this description, the router-associated key is considered static at least for a particular session, even though it could change during a session depending on the updating scheme. During a session when packets are transferred over a predetermined transmission path, each router along the path will thus only have to compute the dynamic parameter O3 for each received packet based on the previously computed O2 and the information I in the packet, in order to find a matching outgoing link and perform the forwarding operation.

By using the semi-static, semi-dynamic and dynamic parameters O1-O3 in this way, the routing information embedded in each packet can be well-protected by using relatively strong cryptographic functions for computing O1 and O2, respectively, while the forwarding operation can be facilitated by using a "lighter" cryptographic function for computing O3 which is done for each packet, preferably in a "streamed" manner. The routing information embedded in O1-O3, effectively authorising the packet to be transmitted along the path, can thus be highly protected by strong cryptographic functions for O1 and O2 while the computation in the routers for forwarding each packet can be facilitated by a relatively lighter cryptographic function for O3 such that transmission delays and processing load are reduced. In this context, the term "lighter cryptographic function" implies that computation of O3 can be made with a minimum of delay, i.e. the matching process can start in the router before all bits of the header have been received, preferably once the first few bits have been received.

In one possible embodiment, the use of the above-described semi-static parameter O1 can be omitted such that the semi-dynamic parameter O2 is computed for each hop based on the session identifier SID and on a router-associated key K or K2 associated with the router of the corresponding hop, while the dynamic parameter O3 is computed based on the semi-dynamic parameter O2 and on the packet-specific information I. During a session, each router along the path will thus compute the semi-dynamic parameter O2 for each outgoing link or candidate hop in the router and then also compute the dynamic parameter O3' for each received packet and candidate hop based on the previously computed O2 and the information I in the packet, in order to find a matching outgoing link and perform the forwarding operation.

In one further embodiment, the cryptographic function for computing O3 is based on a specific encryption function, a so-called self-synchronizing stream cipher configured such that the computation in a router can begin as soon as the router starts to receive bits of the packet-specific information I, which is preferably placed at the beginning of the packet's header. The packet-specific information I may be a so-called "nonce", generated by the sender for each packet, which is a commonly used term representing a "number used once" that could be a random number, a number in a predefined sequence, or a combination thereof.

Figure 3:
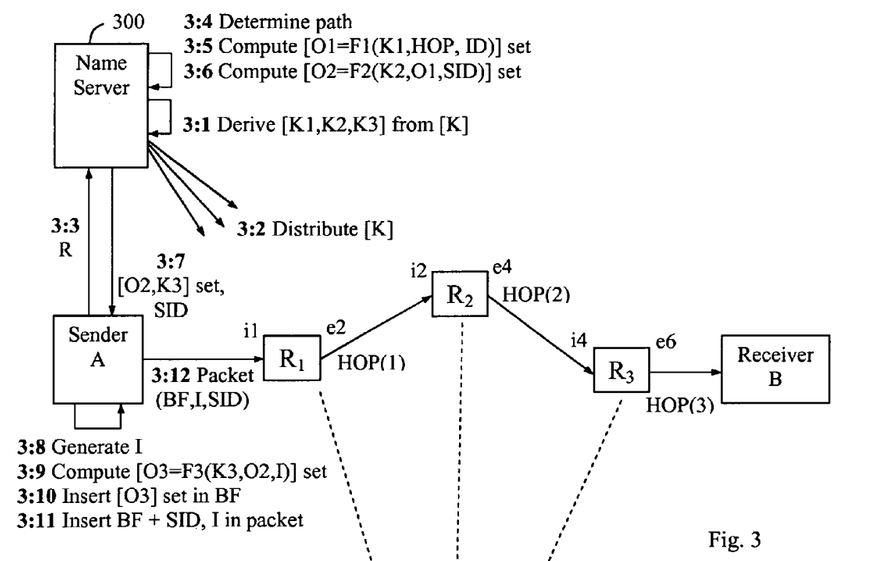
FIG. 3 illustrates a communication scenario for allowing a sender to get across a data packet to a receiver, according to some possible embodiments.

An example of how the above solution can be employed in practice, will now be described with reference to FIG. 3 illustrating a name server 300, a packet sending end-node "sender A", a packet receiving end-node "receiver B", and three intermediate routers R1-R3 in a public packet-switched network. In a configuration phase, the name server 300 assigns a "semi-static" base key K for each router R1-R3 in the network. Each key K is thus associated with one or more routers and may be valid for a certain time period, e.g. 5 minutes, 1 hour or 1 day, after which K is changed or updated.

In a first shown operation 3:1, the name server 300 derives three different sub-keys K1-K3 from each base key K using a Key Derivation Function KDF as follows:

K1=KDF(K,a),
K2=KDF(K,b),
K3=KDF(K,c), where a, b and c are differentiating factors to ensure that K1-K3 are cryptographically separated from each other. The KDF can be a relatively strong cryptographic function, e.g. based on AES (Advanced Encryption Standard) or SHA (Secure Hash Algorithm), since it is applied in an initialisation phase but not in "real-time" or a streamed manner, thereby allowing for some computing latency. As mentioned above, the base key K for each router is updated at regular intervals, hence also the sub-keys K1-K3.

In this example, the name server 300 distributes the router-associated keys K to respective routers in the packet-switched network including the shown routers R1-R3, in a next operation 3:2. Each router R1-R3 is then able to apply the KDF and derive the sub-keys K1-K3 from the received base key K, assuming that KDF is known in the routers, for later use to be described below.

Alternatively, the name server 300 may distribute the likewise router-associated sub-keys K1-K3 directly to the respective routers, thereby relieving the routers from the burden of deriving the sub-keys. On the other hand, more key information must be distributed over the network in that case. The distribution of router-associated keys K or K1-K3 to the routers is repeated whenever the base key K is updated. It can be readily understood that any number of routers, depending on the network topology, may receive and use such router-associated keys K, K1-K3. For example, the router keys may be distributed in conjunction with distribution of other forms of routing information.

As indicated above, operations 3:1-3:2 are performed in an initialisation phase involving application of the relatively strong and "compute-heavy" KDF in preparation for data traffic, while the following operations are performed in a run-time phase, i.e. when there are data packets to transfer from end-node A to end-node B over routers R1-R2.

In a next operation 3:3, having detected that one or more data packets are to be sent to the receiver B as destination, sender A makes a request "R" to the name server 300 for getting data packets across to receiver B in a communication session. The request R may basically be equivalent to the name query Q described for FIG. 2 above.

Server 300 then determines a transmission path or route involving the intermediate routers R1-R3 between sender A and receiver B, based on a known network topology, in a following operation 3:4. It should be noted that there may be multiple different paths or routes available according to the network topology, but one particular path is thus determined for use in this solution before any packet is transmitted. The conditions for selecting the path is however outside the scope of this solution. The determined transmission path involves three hops or links denoted "HOP(1)-(3)" on which the packets will be forwarded from routers R1-R3, as shown in the figure. As said above, the path may be represented by a set of ingress/egress pairs (i1,e2), (i2,e4) and (i4,e6) effectively being 'next hop parameters' identifying all hops in the path.

In a next operation 3:5, the name server 300 computes a semi-static parameter "O1" for each hop in the path based on the predefined router-associated key K, by applying a first cryptographic function "F1" to a first sub-key K1 of the sub-keys K1-K3 for each hop. Thus: O1=F1(K1,"HOP"), where "HOP" denotes a suitable hop identity. Any further semi-static data "ID" may also be embedded in O1, depending on the implementation. As a result, a set of O1 values is obtained, i.e. one O1 value per hop. As explained above, parameter O1 is semi-static in the sense that K1 is only updated at regular intervals, i.e. in a known and predictable manner, and it may be assumed for simplicity that K1 and O1 remains constant throughout this session. By using the router-associated key K, a set of O1 values "[O1]" will be computed, basically one O1 value per hop.

The name server 300 then further computes a semi-dynamic parameter "O2" for each hop in the path, in a following operation 3:6, based on the predefined router-associated key K, the previously computed O1 values and a session identifier "SID" related to this communication session. In this operation, a second cryptographic function "F2" is applied to a second sub-key K2 of the sub-keys K1-K3 for each hop, an O1 value, and the SID. Thus: O2=F2(K2,O1,SID), resulting in a set of O2 values "[O2]", basically one O2 value per hop.

In a next operation 3:7, the name server 300 provides to sender A a set with the computed semi-dynamic parameters O2 and a third sub-key K3 of the sub-keys K1-K3 for each hop, as well as the SID, in response to the request of operation 3:3. In this way, sender A thus receives one pair of O2 and K3 values "[O2,K3]" for each hop in the path and the SID. If it is desirable to conceal the network topology, the name server may optionally permute the [O2] set in random order. Furthermore, when providing A with the key K3=KDF(K,c), K3 can also be made unique to A so that different senders will get different K3 values. This may be achieved for instance by using the K3 router key and compute therefrom: K3A=KDF (K3, "ID A"), where "ID A" is a suitable "identifier" for sender A which could be incorporated in-band in packets transmitted by A. Any router can then locally derive the same key K3A for packets sent by A, which can be done once for a session and then caching K3A for use when receiving further packets in that session. However, the third sub-key K3 may instead be sender-independent and the invention is not limited in this respect.

Sender A is now able to compute a dynamic parameter "O3" for each hop in the path and for each data packet to send, based on the received O2 and K3 values as follows. Thus, when detecting data to send in a data packet, sender A first generates or otherwise obtains some packet-specific information "I" related to the data packet to be sent, in a next operation 3:8. The information I may be generated from bits in the actual packet, or according to any other suitable scheme, e.g. a nonce as described above. However, this solution is not limited to any particular way of generating the packet-specific information I.

In a next operation 3:9, sender A computes the dynamic parameter O3 for each hop in the path based on the corresponding semi-dynamic parameter O2 and the generated packet-specific information I. In more detail, sender A applies a third cryptographic function "F3" to a third sub-key K3 of the sub-keys K1-K3 for each hop, a corresponding O2 value received in operation 3:7, and the generated I. Thus: O3=F3 (K3,O2,I) in this example, resulting in a set of O3 values "[O3]", basically one O3 value per hop.

As said above, F3 may be based on a self-synchronizing stream cipher configured to expedite the computation in routers R1-R3 to begin as soon as the bits of I starts to be received, which will be described further below. Preferably, F3 is a relatively light cryptographic function suitable for smooth and repeated application on a stream of data packets, thereby not causing undue delays.

Sender A then creates a Bloom Filter "BF" and inserts the set of computed O3 values [O3] therein, e.g. by converting O3 into bit positions set to "1" in the BF, in an operation 3:10.

Sender A further inserts the created BF as well as the session identifier SID and the generated packet-specific information I in the packet to be sent, in a further operation 3:11. Sender A finally sends out the data packet on the network, i.e. firstly to router R1, in a last shown step 3:12. Whenever detecting further data to send, sender A will generate new packet-specific information "I" related to the next data packet to be sent, and repeats operations 3:8-3:12 as described above for sending out the next data packet. As mentioned above, sender A may alternatively add the O3 values explicitly to the packet, thus omitting the use of a BF.

Thereby, information related to each hop in the predetermined transmission path R1-R3 is actually encoded by means of the router-associated keys K1-K3 embedded in each data packet by the above computation of O1, O2 and O3, effectively authorising the packets to be forwarded accordingly in each router towards its destination, i.e. sender B. Furthermore, the BF in each packet is exclusively related to that packet as the packet-specific information I was used to compute O3 as described above. It is thus not possible for an unauthorised party to intercept the routing information in the packet and use it in another data packet.

The procedure described above may be modified in different ways. For example, the semi-static parameter O1 may, as mentioned above, be omitted such that name server 300 directly computes the semi-dynamic parameter O2 for each hop by applying F2 according to: O2=F2(K2,SID,"HOP") where "HOP" denotes a suitable hop identity. Another somewhat simplified possibility is to use a single router-associated key K for each hop instead of the differentiated sub-keys K1-K3 when calculating two or more of O1, O2 and O3. For example, if O1 is used, it may be computed as O1=F1(K), while O2 may be computed as O2=F2(K,O1,SID), and O3 may be computed as O3=F3(K,O2,I). However, as the O3 computations are made by the sender A, it may not be deemed secure to provide a system-wide key K to A, but rather provide a sender-unique key, e.g. the above-described K3A=KDF(K, "ID A"), from which sender A then can compute the dynamic parameter O3.

Figure 4:
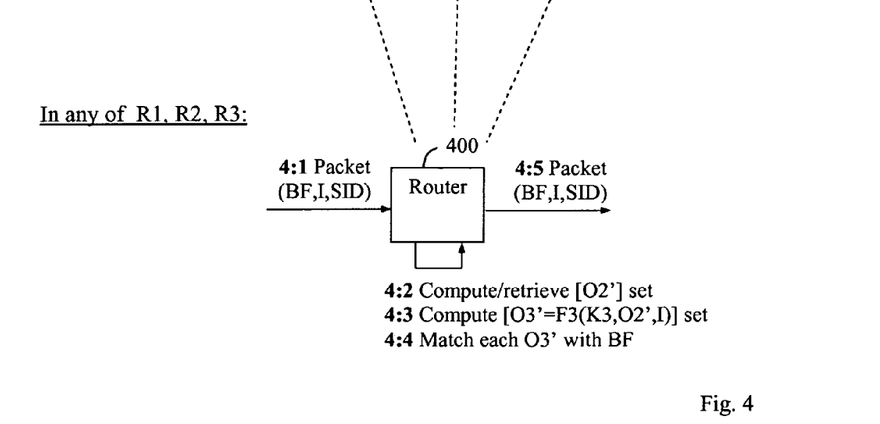
FIG. 4 illustrates a router in FIG. 3 when performing a forwarding operation for the data packet prepared in FIG. 3, according to another exemplary embodiment.

A procedure of performing a forwarding operation in any of the routers R1-R3 in FIG. 3, will now be described with reference to FIG. 4 which can be seen as a direct continuation of the procedure in FIG. 3. It is assumed that the cryptographic functions F1-F3 are known to the router 400, and that currently valid sub-keys K1-K3 have been distributed to the router or obtained from a distributed base key K, as described above.

The router 400 has a plurality of available outgoing links on which received data packets can potentially be forwarded, here called "candidate hops". In preparation for forwarding incoming data packets, router 400 is able to calculate the semi-static parameter O1' for each candidate hop, "HOP'", by applying F1 on the distributed or derived first sub-key K1 for each of these available outgoing links in advance, thus O1'=F1(K1,HOP'), i.e. before any packet is received since no packet or session related data is needed as input.

In a first shown operation 4:1, the router 400 receives a data packet that has been sent from sender A and containing a BF and the parameter I, the BF comprising a set of dynamic parameters O3 into which all next hop parameters of the transmission path of the packet are effectively encoded. The packet also contains an identifier SID for the current session. The following described operations are performed by the router 400 in a process of taking a forwarding decision for sending the packet to a next-hop router, i.e. one or more of the candidate hops.

The router 400 will now test each of the outgoing links or candidate hops available in the router, to see if any of them matches the O3 values in the received BF, as follows. In this process, the router 400 computes the semi-dynamic parameter O2' for each available outgoing link or candidate hop, in a next operation 4:2, using F2 based on the second sub-key K2, the corresponding and previously computed O1' and the received session identifier SID, as O2'=F2(K2,O1,SID).

As mentioned above, this computation of O2' for the candidate hops may be done just once for a session since the semi-dynamic parameter remains the same throughout the session, at least when assuming that the router-associated keys are not updated during the session. Therefore, the router 400 computes O2' for each candidate hop after receiving the first packet in a session and stores the computed O2' values. Whenever receiving further packets within the same session, the router retrieves the O2' values in operation 4:2 for further processing.

The router 400 then computes a dynamic parameter O3' for each available outgoing link or candidate hop using F3 based on the third sub-key K3, the corresponding computed semi-dynamic parameter O2' and on the packet-specific information I in the received packet, in an operation 4:3, as O3'=F3(K3,O2',I).

It should be noted that if F3 is based on a self-synchronizing stream cipher, the computation of O3' in router 400 can begin as soon as the bits of I starts to be received, which are preferably placed in the beginning of the packet, or at least before all header bits have been received. Thus, this operation can be executed in a streamed manner since each new received input bit of I can be used to produce one output bit of O3' very efficiently, and the router does not need to buffer input bits before producing output bits. The self-synchronizing stream cipher will be explained in more detail later below. In addition, the dynamic parameter O3' may be computed for plural candidate hops in parallel, to further speed up the forwarding operation.

The router 400 is now able to compare the O3' values computed for each candidate hop, one by one, with the O3 values in the BF in the received packet, in an operation 4:4, in order to determine whether any of the computed O3' values matches any of the O3 values present in the BF of the received packet. This operation can be performed by using regular BF processing as known per se. Thus, in order to determine if a certain candidate O3' value is a member of a data set being encoded by the Bloom filter, bit-positions h1(O3'), h2(O3'), ... hk(O3') are checked, and if all these bit-positions are "1", it can be assumed that O3' is actually a member of the data set. Alternatively, if the O3 values are explicitly included in the packet not using a Bloom filter, the matching can be done by simply checking if any of the computed O3' values equals any of the O3 values present in the packet.

If router 400 finds an O3' value that matches a next hop parameter encoded in the BF in the above manner, the packet is forwarded on the outgoing link or candidate hop corresponding to the matching O3' value, in an operation 4:5. If no match is found, the packet would simply be discarded, not shown. Thus, at least one candidate hop must match the received BF in order to get the packet forwarded. There may be more than one candidate hop in the router matching a next hop parameter encoded in the BF, in that case allowing for multicast transmission of the packet.

In the shown example, router R1 in FIG. 3 would calculate a O3' value for the candidate hop of (i1,e2) matching the BF and resulting in a next hop "HOP(1)" to router R2. Further, router R2 would calculate a matching O3' value for the candidate hop of (i2,e4) resulting in a next hop "HOP(2)" to router R3, while router R3 would calculate a matching O3' value for the candidate hop of (i4,e6) resulting in a next hop "HOP(3)" to receiver B.

As mentioned above, to enable routers to start the routing decision computations before having received the entire packet header containing the packet specific information I, the computation of O3'=F3(K3,O2',I) may be made based on a self-synchronizing stream cipher (SSSC). The usage of SSSCs in the specific context of this solution is non-standard and will now be described in more detail.

Normally, a sender would use a SSSC to encrypt some plaintext and a receiver would use the SSSC to decrypt the corresponding received cipher text. However, for the purpose of this solution, it is necessary that both "sender" (A) and "receiver", in this case being a router "R", use the SSSC in the same mode, e.g. a decrypt mode. An SSSC in decrypt mode has three inputs: a key, a initialization value, and a cipher text.

First, the initialization value is assigned some arbitrary agreed value (e.g. 000 ... ). Then, the function F3(K3, I), used by both A and R, is defined to be the SSSC applied to the fixed initialization value, with I as the cipher text, and using K3 as the deciphering key. By the properties of SSSCs, as soon as the first few bit(s) of I arrive at the router, the SSSC decryption process may start and will produce the bits of O3 basically at "line-speed". Further information on SSSC mechanisms can be found in Chapter 6 of "Handbook of Applied Cryptography", by A. Menezes, P. van Oorschot, and S. Vanstone, CRC Press, 1996.

Figure 5:
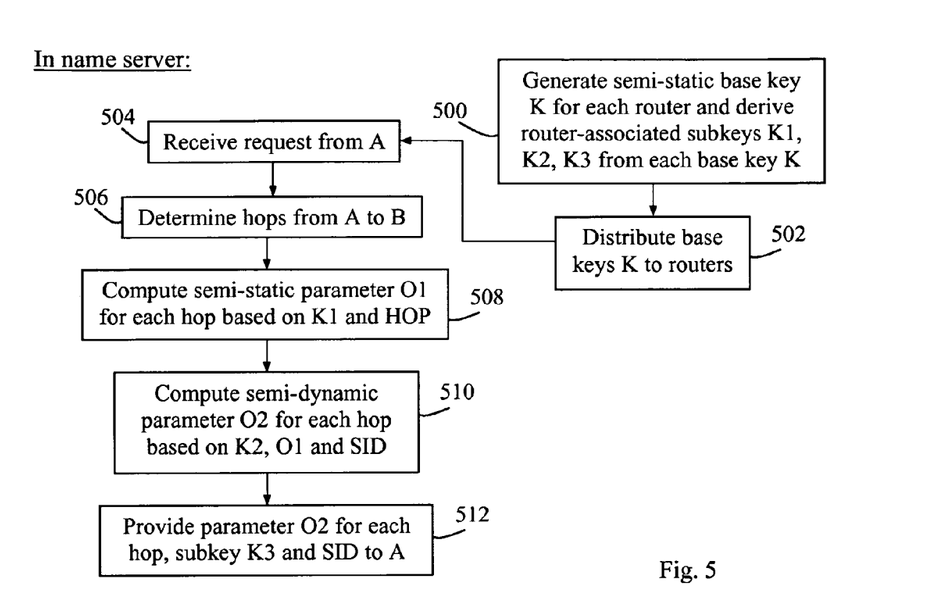
FIG. 5 is a flow chart with steps performed by a name server to support a forwarding operation in routers, according to further exemplary embodiments.

An exemplary procedure executed in a name server, e.g. server 300 in FIG. 3, for supporting a forwarding operation in routers of a packet-switched network, will now be described with reference to the flow chart in FIG. 5. In a first shown step 500, a semi-static router-associated base key K is generated for each router. Further, the name server derives router-associated sub-keys, e.g. K1, K2 and K3 in the previous example, from each base key K in this example, thus making all keys K, K1-K3 associated to respective routers. The base keys are then distributed to the routers in the network, in a next step 502. Alternatively, the name server may distribute the sub-keys K1-K3 to the routers in step 502 to relieve them from the processing or computation burden, as mentioned above.

In a next step 504, a request is received from a sending end-node for getting data packets across to a receiving end-node in a communication session, basically corresponding to operation 3:3 in FIG. 3. The name server then determines a transmission path with a series of hops from the sending end-node to the receiving end-node, in a further step 506, basically corresponding to operation 3:4 in FIG. 3.

In this example, the name server computes a semi-static parameter O1 for each hop in the path based on a first one K1 of the router-associated sub-keys and respective hop identities HOP, in a next step 508. As mentioned above, the use of a semi-static parameter O1 may however be omitted without departing from the invention. The name server then computes a semi-dynamic parameter O2 for each hop in the path based on a second one K2 of the router-associated sub-keys, the semi-static parameter O1, and a session identifier SID related to the communication session, in a following step 510.

In a final step 512, the name server provides to the sending end-node, in response to the request of step 504, the session identifier SID, the computed hop-specific semi-dynamic parameters O2, and either the third one K3 of the router-associated sub-keys or a sender-specific sub-key K3A derived from sub-key K3, for each hop in the path. Thereby, the sending end-node is able to compute a dynamic parameter O3 for each hop in the path based on the sub-keys K3, the semi-dynamic parameters O2 and on some generated packet-specific information I related to a data packet, and to send that data packet with the session identifier SID, the computed dynamic parameters O3 and the packet-specific information I over the packet-switched network through the transmission path.

Figure 6:
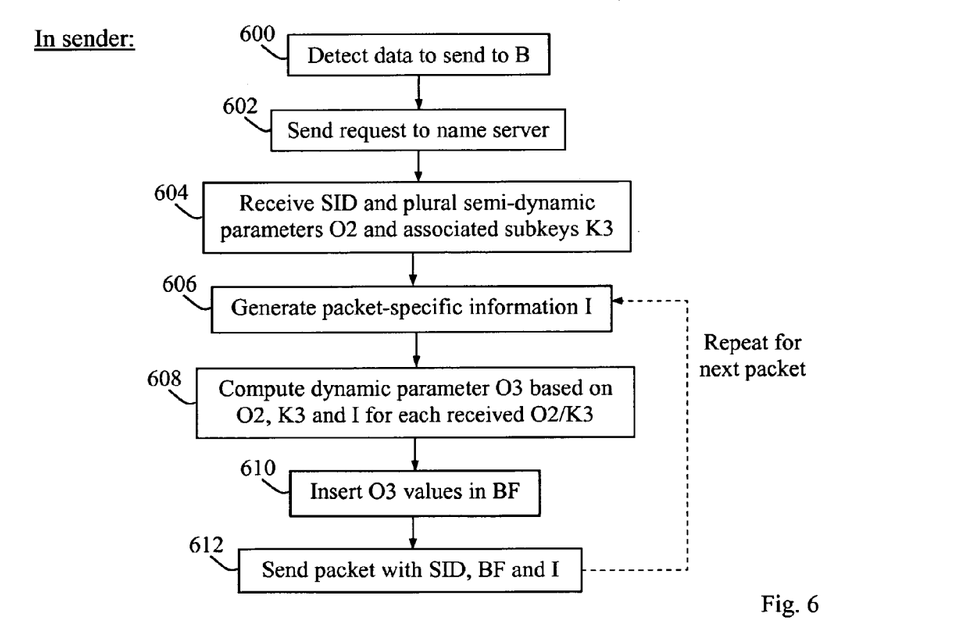
FIG. 6 is a flow chart with steps performed by a sending end-node for getting across a data packet to a receiving end-node, according to further exemplary embodiments.

An exemplary procedure executed in a sending end-node, e.g. sender A in FIG. 3, for supporting a forwarding operation in routers of a packet-switched network, will now be described with reference to the flow chart in FIG. 5. In a first shown step 600, the sending end-node detects that data is to be sent to a receiving end-node B. The sending end-node then makes a request to a name server for getting data packets across to the receiving end-node in a communication session, in a next step 602. In response thereto, the sending end-node receives a plurality of semi-dynamic parameters O2 and a session identifier SID from the name server, in a following step 604. Each semi-dynamic parameter O2 is associated with a hop in a transmission path from the sending end-node (A) to the receiving end-node (B) as determined by the name server when receiving the request.

The sending end-node then generates packet-specific information I related to a data packet to send, in a next step 606, which could be a nonce or the like as mentioned above. The sending end-node also computes a dynamic parameter O3 for each hop in the path based on the corresponding semi-dynamic parameter O2, the received sub-keys K3 or K3A, and the generated packet-specific information I, in a further step 608. The sending end-node then inserts the calculated O3 values in a BF, in a step 610, and sends the data packet with the session identifier SID, the computed dynamic parameters O3 and the packet-specific information I over the packet-switched network through said transmission path, in a final step 612.

Thereby, when receiving the packet, the routers are able to compute a dynamic parameter O3' for each available outgoing link or candidate hop in the router based on the packet-specific information I in the packet, and to match the computed dynamic parameters O3' with the dynamic parameters O3 in the packet. Alternatively, the sending end-node may include the dynamic parameter O3' explicitly in the packet, i.e. as is, and steps 610 and 612 would in that case be replaced by a step of sending the packet with O3' values and I.

Figure 7:
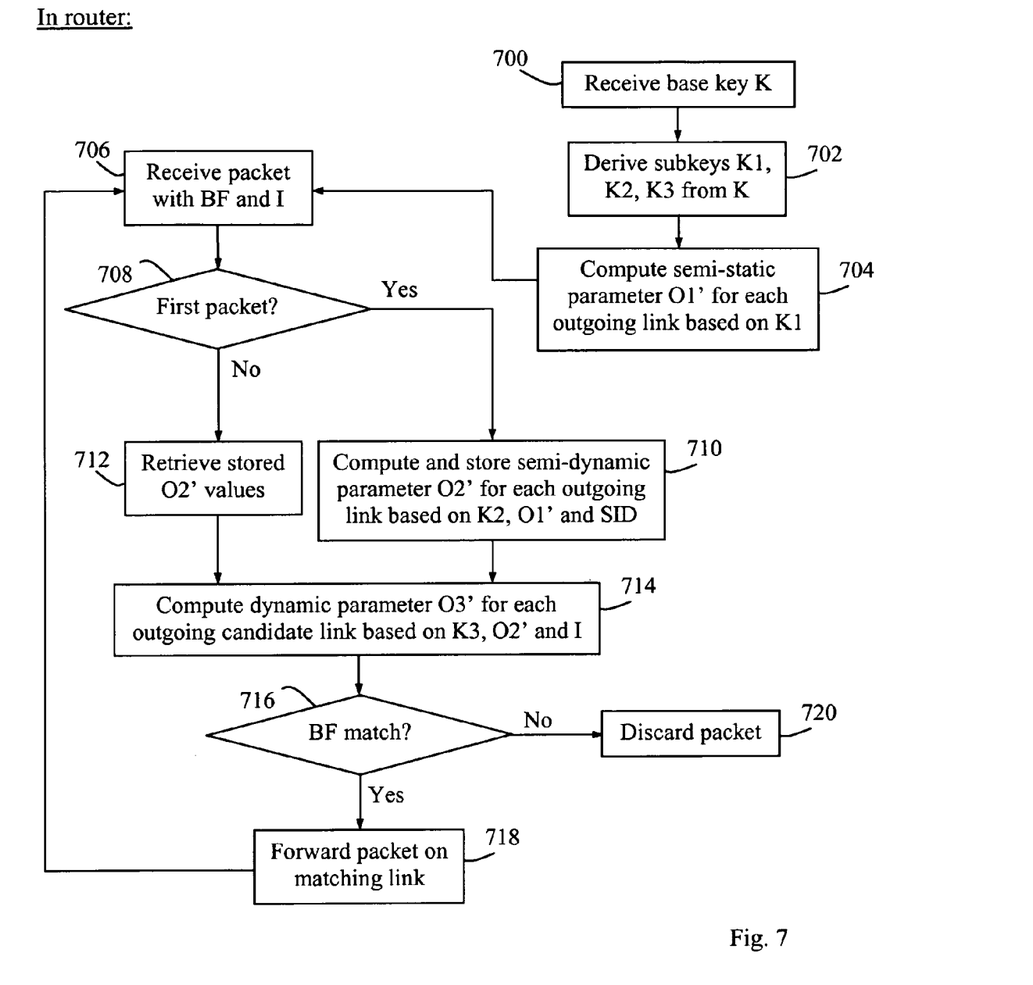
FIG. 7 is a flow chart with steps performed by a router in an packet-switched network for executing a forwarding operation for a data packet, according to further exemplary embodiments.

An exemplary procedure executed in a router of a packet-switched network, e.g. router 400 in FIG. 4, for performing a forwarding operation, will now be described with reference to the flow chart in FIG. 7. In a first shown step 700, the router receives a router-associated base key K distributed from a name server, which may be unique for that router or shared with one or more other routers. In a next step 702, the router derives likewise router-associated sub-keys K1, K2, K3 from the base key K e.g. by applying the KDF on K in the manner described above. In this example, the router can also compute a semi-static parameter O1' for each available outgoing link or candidate hop based on a first one K1 of the above sub-keys, in a step 704, in preparation for forwarding incoming data packets before any packet is received, as O1=F1(K1, HOP), i.e. since no packet or session related data is needed as input.

The router then receives a data packet, in a next step 706, coming from a sending end-node A in a communication session with a receiving end-node. The received data packet comprises a plurality of dynamic parameters O3 embedded in a BF and also some packet-specific information I related to that data packet, where each dynamic parameter O3 is associated with a hop in a transmission path that has been determined for the session by a name server, as described above. The packet also comprises a session identity SID related to the communication session.

If it is determined in a next step 708, that the received packet is the first packet of the session, a semi-dynamic parameter O2' is computed and stored for each available outgoing link or candidate hop in the router, in a step 710. In the latter step, the router computes the semi-dynamic parameter O2' based on a second one K2 of the above sub-keys, the semi-static parameter O1 and the session identifier SID. As described above, the semi-static parameter O1 may be omitted from this procedure without departing from the invention.

On the other hand, if it is determined in step 708 that the received packet is not the first packet of the session, the O2' values have already been computed and stored, and the router can therefore simply retrieve the stored O2' values in an alternative step 712.

In a next step 714, the router computes a dynamic parameter O3' for each available outgoing link or candidate hop in the router based on a third one K3 of the above sub-keys, the corresponding computed semi-dynamic parameter O2' and on the packet-specific information I in the received packet. It is then determined in a step 716 whether any of the computed dynamic parameters O3' matches any of the dynamic parameters O3 in the BF of the received packet. If a match is found in the previous step, the router forwards the packet on an outgoing link or candidate hop corresponding to the matching computed dynamic parameter O3', in a step 718. Otherwise, the packet is discarded in a final shown step 720.

In step 714, the router may compute the dynamic parameter O3' by a cryptographic function F3 which is based on a self-synchronizing stream cipher. In that case, the computation can begin as soon as bits of the packet-specific information I in the packet starts to be received, or at least before all bits of I have been received, as explained in more detail above. In addition, the dynamic parameter O3' may be computed for plural available outgoing links or candidate hops in parallel.

Arrangements in a name server, a sending end-node and a router, respectively, will now be described in more detail with reference to the block diagram of FIG. 8. The name server 800 and the sending end-node are both configured to support the forwarding of data packets in routers of a packet-switched network, while the router is configured to perform a forwarding operation. The name server 800, the sending end-node 802 and the router 804 may be used to accomplish any of the above-described procedures and embodiments. The various functions therein are called "units" in this description, although they could also be seen as modules, blocks, elements or components.

According to the arrangements in FIG. 9, the name server 800 comprises a receiving unit 800a adapted to receive a request from the sending end-node 802 for getting data packets across to a receiving end-node, not shown, in a communication session. The name server 800 further comprises a determining unit 800b adapted to determine a transmission path with a series of hops from the sending end-node 802 to the receiving end-node.

The name server 800 also comprises a computing unit 800c adapted to compute a semi-dynamic parameter O2 for each hop in the path based on a predefined router-associated key K and a session identifier SID related to said communication session. Name server 800 further comprises a providing unit 800d adapted to provide at least the session identifier SID and the computed semi-dynamic parameters O2 to the sending end-node 802, in response to said request. Thereby, the sending end-node is able to compute a dynamic parameter O3 for each hop in the path based on the semi-dynamic parameters O2 and some generated packet-specific information I related to a data packet, and to send the data packet with the session identifier SID, a set of computed dynamic parameters O3 and the packet-specific information I over the packet-switched network through said transmission path.

The computing unit 800c may be further adapted to compute a semi-static parameter O1 for each hop in the path based on the predefined router-associated key K, and to compute said semi-dynamic parameter O2 further based on the corresponding semi-static parameter O1.

The sending end-node 802 comprises a first sending unit 802a adapted to send a request to name server 800 for getting data packets across to the receiving end-node in a communication session. The sending end-node 802 further comprises a receiving unit 802b adapted to receive a session identifier SID related to said communication session, and semi-dynamic parameters O2 from the name server, each semi-dynamic parameter O2 being associated with a hop in a transmission path from the sending end-node to the receiving end-node.

The sending end-node 802 further comprises a generating unit 802c adapted to generate packet-specific information I related to a data packet to send, and a computing unit 802d adapted to compute a dynamic parameter O3 for each hop in the path based on at least the corresponding semi-dynamic parameter O2 and the generated packet-specific information I. The sending end-node 802 also comprises a second sending unit 802e adapted to send the data packet with the computed dynamic parameters O3, the session identifier SID, and the packet-specific information I over the packet-switched network through said transmission path.

Thereby, the routers in the transmission path are able to compute a dynamic parameter O3' for each available outgoing link or candidate hop in the router based on the packet-specific information I in the packet, and to match the computed dynamic parameters O3' with the dynamic parameters O3 in the packet.

The second sending unit 802e may be further adapted to include the dynamic parameters O3 in a Bloom filter BF added to the packet, thereby enabling the routers to use existing mechanisms for handling the Bloom filter when receiving the packet.

The router 804 comprises a receiving unit 804a adapted to receive a data packet coming from a sending end-node 802 in a communication session and comprising dynamic parameters O3, a session identifier SID related to that communication session, and packet-specific information I related to the data packet, each dynamic parameter O3 being associated with a hop in a transmission path from the sending end-node 802 to the receiving end-node.

The router 804 further comprises a computing unit 804b adapted to compute or retrieve a semi-dynamic parameter O2' for each available outgoing link or candidate hop in the router, each semi-dynamic parameter O2 being computed based on a predefined router-associated key K and the session identifier SID, and to compute a dynamic parameter O3' for each available outgoing link or candidate hop in the router based on the corresponding computed semi-dynamic parameter O2' and the packet-specific information I in the received packet.

The router 804 also comprises a determining unit 804c adapted to determine whether any of the computed dynamic parameters O3' matches any of the dynamic parameters O3 in the received packet, and a forwarding unit 804d adapted to forward 720 the packet on an outgoing link or candidate hop A, B, C . . . corresponding to a matching computed dynamic parameter O3', or discard the packet if no matching computed dynamic parameter O3' is found.

The computing unit 804b may be further adapted to compute a semi-static parameter O1' for each available outgoing link or candidate hop in the router based on the predefined router-associated key K, and to compute said semi-dynamic parameter O2' further based on the corresponding semi-static parameter O1'. As described above, the dynamic parameter O3' may be computed by a cryptographic function which is based on a self-synchronizing stream cipher, and wherein said computation is begun before all bits of the packet-specific information I in the packet have been received. The dynamic parameter O3' may further be computed for plural available outgoing links or candidate hops in parallel.

Figure 8:
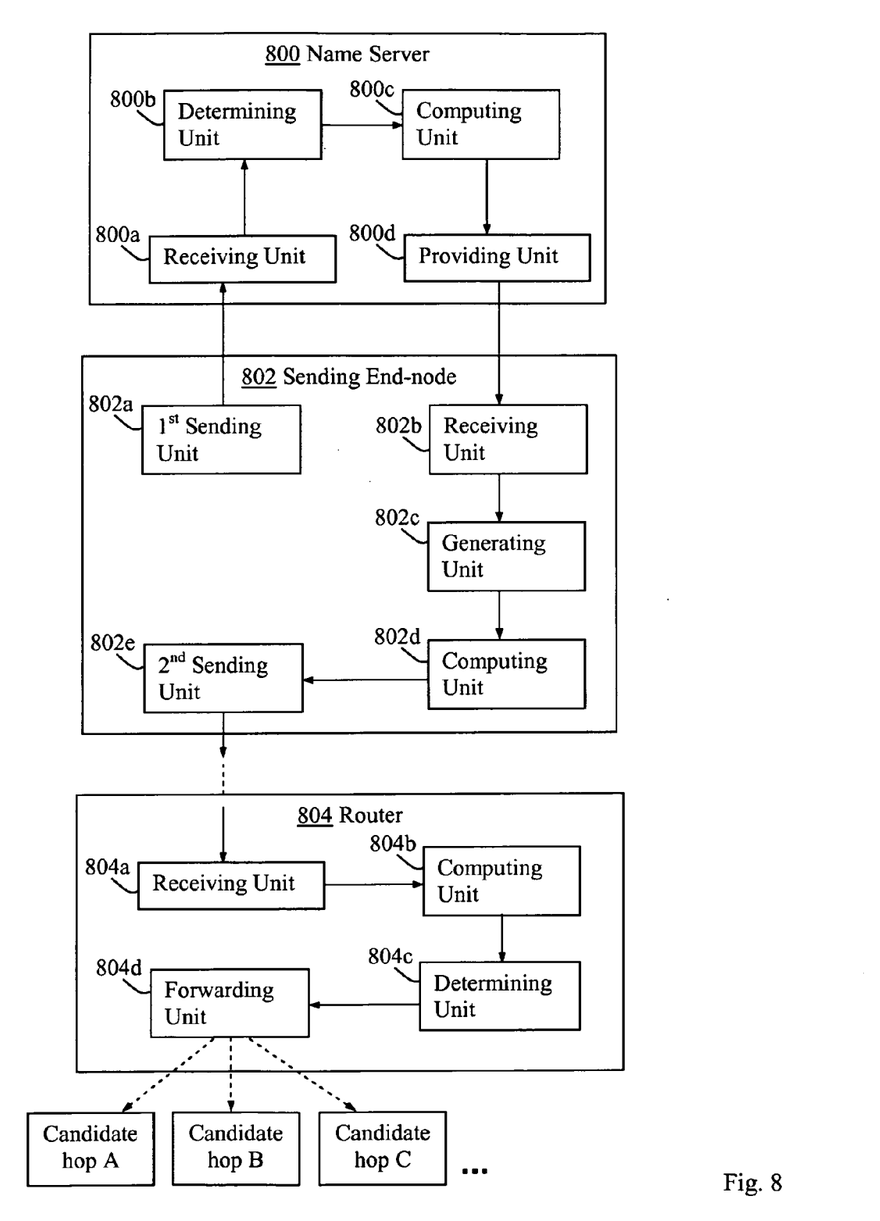
FIG. 8 is a schematic block diagram illustrating in more detail a name server, a sending end-node and a router in a packet-switched network, according to further exemplary embodiments.

It should be noted that FIG. 8 merely illustrates various functional units or modules in the network node 904 and user device 902 in a logical sense, although the skilled person is free to implement these functions in practice using suitable software and hardware means. Thus, the invention is generally not limited to the shown structures of the entities 904 and 902, respectively, while its functional units 904a-d and 902a-b may be configured to operate according to the methods and procedures described above for FIGS. 3-7, where appropriate.

The described embodiments can be used to enable a forwarding operation in routers requiring a minimum of processing yet providing a high level of security. The routing of data packets can thus be controlled in this way to avoid flooding, spamming, virus, fraud, attacks and generally unsolicited traffic. While the invention has been described with reference to specific exemplary embodiments, the description is generally only intended to illustrate the inventive concept and should not be taken as limiting the scope of the invention. The present invention is defined by the appended claims.

The invention claimed is:

1. A method in a name server of supporting a forwarding operation in routers of a packet-switched network, the method comprising:
   receiving a request from a sending end-node related to getting data packets across to a receiving end-node in a communication session;
   determining a transmission path with a series of hops from the sending end-node to the receiving end-node;
   computing a semi-dynamic parameter for each hop in the path based on a predefined router-associated key; and
   providing at least the computed semi-dynamic parameters to the sending end-node in response to the request, thereby enabling the sending end-node to compute a dynamic parameter for each hop in the path based on the semi-dynamic parameters and packet-specific information related to a data packet, and to send the data packet with the computed dynamic parameters, and the packet-specific information over the packet-switched network through said transmission path.

2. The method of claim 1, wherein the semi-dynamic parameter is computed further based on a session identifier related to—the communication session, and the session identifier is also provided to the sending end-node in response to the request, thereby enabling the sending end-node to include the session identifier when sending the data packet.

3. The method of claim 1, wherein a semi-static parameter is computed for each hop in the path based on the predefined router-associated key, and wherein the semi-dynamic parameter is computed further based on the corresponding semi-static parameter.

4. The method of claim 3, wherein each router-associated key comprises a base key and a plurality of sub-keys derived from the base key using a Key Derivation Function, and wherein the semi-static parameter is computed for each hop in the path based on a first one of the sub-keys.

5. The method of claim 4, wherein the semi-dynamic parameter is computed for each hop in the path further based on a second one of the sub-keys.

6. The method of claim 5, wherein a third one of the sub-keys is also provided to the sending end-node, thereby enabling the sending end-node to compute the dynamic parameter for each hop in the path further based on the third sub-key.

7. The method of claim 1, wherein the predefined router-associated key is distributed to corresponding routers in a initialization phase and is also changed according to a predefined updating scheme.

8. A computer program product comprising a non-transitory computer-readable storage medium having computer-readable program code embodied in said medium, said computer-readable program code configured to be executed on a node in a telecommunications network, the code operable to cause the node to perform a method of claim 1.

9. An arrangement in a name server configured to support forwarding of data packets in routers of a packet-switched network, the arrangement comprising:
a receiving unit configured to receive a request from a sending end-node related to getting data packets across to a receiving end-node in a communication session;
a determining unit configured to determine a transmission path with a series of hops from the sending end-node to the receiving end-node;
a computing unit configured to compute a semi-dynamic parameter for each hop in the path based on a predefined router-associated key; and
a providing unit configured to provide at least the computed semi-dynamic parameters to the sending end-node in response to the request, thereby enabling the sending end-node to compute a dynamic parameter for each hop in the path based on the semi-dynamic parameters and packet-specific information related to a data packet, and to send the data packet with a set of computed dynamic parameters and the packet-specific information over the packet-switched network through the transmission path.

10. The arrangement of claim 9:
wherein the computing unit is configured to compute the semi-dynamic parameter further based on a session identifier related to the communication session; and
wherein the providing unit is configured to also provide the session identifier to the sending end-node in response to the request, thereby enabling the sending end-node to include the session identifier when sending the data packet.

11. The arrangement of claim 9, wherein the computing unit is further configured to:
compute a semi-static parameter for each hop in the path based on the predefined router-associated key; and
compute the semi-dynamic parameter further based on the corresponding semi-static parameter.

12. A method in a sending end-node of supporting a forwarding operation in routers of a packet-switched network when sending data packets, the method comprising:
sending a request to a name server related to getting data packets across to a receiving end-node in a communication session;
receiving semi-dynamic parameters from the name server, each semi-dynamic parameter being associated with a hop in a transmission path from the sending end-node to the receiving end-node;

generating packet-specific information related to a data packet to send;
computing a dynamic parameter for each hop in the path based on the corresponding semi-dynamic parameter and the generated packet-specific information; and
sending the data packet with the computed dynamic parameters and the packet-specific information over the packet-switched network through the transmission path, thereby enabling the routers to compute a dynamic for each available outgoing link or candidate hop in at least one router in the transmission path based on the packet-specific information in the packet, and to match the computed dynamic parameters with the dynamic parameters in the packet.

13. The method of claim 12, wherein a session identifier related to the communication session is also received from the name server, and the session identifier is included when sending the data packet.

14. The A method of claim 12, wherein the dynamic parameters are included in a Bloom filter added to the packet, thereby enabling the routers to match available next-hop links against the Bloom filter for making forwarding decisions.

15. The method of claim 12:
wherein each router-associated key comprises a base key and a sub-key derived from the base key using a Key Derivation Function, the sub-key also being received from the name server; and
wherein the sending end-node computes the dynamic parameter for each hop in the path further based on the sub-key.

16. An arrangement in a sending end-node configured to support a forwarding operation in routers of a packet-switched network when sending data packets, the arrangement comprising:
a first sending unit configured to send a request to a name server related to getting data packets across to a receiving end-node in a communication session;
a receiving unit configured to receive semi-dynamic parameters from the name server, each semi-dynamic parameter being associated with a hop in a transmission path from the sending end-node to the receiving end-node;
a generating unit configured to generate packet-specific information related to a data packet to send;
a computing unit configured to compute a dynamic parameter for each hop in the path based on at least the corresponding semi-dynamic parameter and the generated packet-specific information; and
a second sending unit adapted to send the data packet with the computed dynamic parameters and the packet-specific information over the packet-switched network through the transmission path, thereby enabling the routers to compute a dynamic parameter for each available outgoing link or candidate hop in at least one router in the transmission path based on the packet-specific information in the packet, and to match the computed dynamic parameters with the dynamic parameters in the packet.

17. The arrangement of claim 16, wherein the receiving unit is also configured to receive a session identifier related to the communication session from the name server, and the second sending unit is also configured to include the session identifier when sending the data packet.

18. The arrangement of claim 16, wherein the sending unit is further configured to include the dynamic parameters in a Bloom filter added to the packet, thereby enabling the routers to match available next-hop links against the Bloom filter for making forwarding decisions.

19. The arrangement of claim 16:
wherein each router-associated key comprises a base key and a sub-key derived from the base key using a Key Derivation Function, the sub-key also being received from the name server; and
wherein the sending end-node computes the dynamic parameter for each hop in the path further based on the sub-key.

20. A method in a router of a packet-switched network of performing a forwarding operation, the method comprising:
receiving a data packet coming from a sending end-node in a communication session and comprising dynamic parameters, and packet-specific information related to the data packet, each dynamic parameter being associated with a hop in a transmission path from the sending end-node to a receiving end-node;
computing or retrieving a semi-dynamic parameter for each available outgoing link or candidate hop in the router, based on a predefined router-associated key;
computing a dynamic parameter for each outgoing link or candidate hop in the router based on the corresponding computed semi-dynamic parameter and the packet-specific information in the received packet;
determining whether any of the computed dynamic parameters matches any of the dynamic parameters in the received packet; and
forwarding the packet on an outgoing link or candidate hop corresponding to the matching computed dynamic parameter if a match is found and discarding the packet if a match is not found.

21. The method of claim 20:
wherein the received data packet further comprises a session identifier related to the communication session; and
wherein the semi-dynamic parameter is computed further based on the session identifier.

22. The method of claim 20:
wherein a semi-static parameter has been computed for each available outgoing link or candidate hop in the router based on the predefined router-associated key; and
wherein the semi-dynamic parameter is computed further based on the corresponding semi-static parameter.

23. The method of claim 20:
wherein the dynamic parameter is computed by a cryptographic function which is based on a self-synchronizing stream cipher; and
wherein the computation is begun before all bits of the packet-specific information in the packet have been received.

24. The method of claim 23, wherein the dynamic parameter is computed for plural available outgoing links or candidate hops in parallel.

25. The method of claim 20:
wherein the packet comprises a Bloom filter in which the dynamic parameters are included; and
wherein available outgoing links or candidate hops are matched against the Bloom filter for making forwarding decisions.

26. An arrangement in a router of a packet-switched network, configured to perform a forwarding operation, the arrangement comprising:
a receiving unit configured to receive a data packet coming from a sending end-node in a communication session and comprising dynamic parameters and packet-specific information related to the data packet, each dynamic parameter being associated with a hop in a transmission path from the sending end-node to a receiving end-node;
a computing unit configured to compute or retrieve a semi-dynamic parameter for each available outgoing link or candidate hop in the router, each semi-dynamic parameter being computed based on a predefined router-associated key, and to compute a dynamic parameter for each available outgoing link or candidate hop in the router based on the corresponding computed semi-dynamic parameter and the packet-specific information in the received packet;
a determining unit configured to determine whether any of the computed dynamic parameters matches any of the dynamic parameters in the received packet; and
a forwarding unit configured to forward the packet on an outgoing link or candidate hop corresponding to a matching computed dynamic parameter, or discard the packet if no matching computed dynamic parameter is found.

27. The arrangement of claim 26:
wherein the received data packet further comprises a session identifier related to the communication session; and
wherein the semi-dynamic parameter is computed further based on the session identifier.

28. The arrangement of claim 26, wherein the computing unit is further configured to:
compute a semi-static parameter for each available outgoing link or candidate hop in the router based on the predefined router-associated key; and
compute the semi-dynamic parameter further based on the corresponding semi-static parameter.

29. The arrangement of claim 26:
wherein the dynamic parameter is computed by a cryptographic function which is based on a self-synchronizing stream cipher; and
wherein the computation is begun before all bits of the packet-specific information in the packet have been received.

30. The arrangement of claim 29, wherein the computing unit is further configured to compute the dynamic parameter for plural available outgoing links or candidate hops in parallel.

31. The arrangement of claim 26:
wherein the packet comprises a Bloom filter in which the dynamic parameters are included; and
wherein the determining unit is further configured to match available outgoing links or candidate hops against the Bloom filter for making forwarding decisions.

32. A method of supporting a forwarding operation in routers of a packet-switched network, the method comprising:
a name server receiving a request from a sending end-node related to getting data packets across to a receiving end-node in a communication session;
the name server determining a transmission path with a series of hops from the sending end-node to the receiving end-node;
the name server computing a semi-dynamic parameter for each hop in the path based on a predefined router-associated key;
the name server providing at least the computed semi-dynamic parameters to the sending end-node in response to the request;
the sending end-node generating packet-specific information related to a data packet to send;

the sending end-node computing a dynamic parameter for each hop in the path based on the corresponding semi-dynamic parameter and the generated packet-specific information;

the sending end-node sending the data packet with the computed dynamic parameters and the packet-specific information over the packet-switched network through the transmission path;

a router in the transmission path receiving the packet and computing or retrieving a semi-dynamic parameter for each available outgoing link or candidate hop in the router, each semi-dynamic parameter being computed based on at least the predefined router-associated key;

the router computing a dynamic parameter for each available outgoing link or candidate hop in the router based on the corresponding computed semi-dynamic parameter and the packet-specific information in the received packet; and the router determining whether any of the computed dynamic parameters matches any of the dynamic parameters in the received packet, and if a match is found in the previous step, forwarding the packet on an outgoing link or candidate hop corresponding to the matching computed dynamic parameter, otherwise discarding the packet.

* * * * *